(12) United States Patent
Takata et al.

(10) Patent No.: US 6,526,400 B1
(45) Date of Patent: Feb. 25, 2003

(54) INFORMATION SEARCH APPARATUS AND METHOD

(75) Inventors: Tomomi Takata, Yokohama (JP); Yuji Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/409,090

(22) Filed: Sep. 30, 1999

(30) Foreign Application Priority Data

Sep. 30, 1998 (JP) .......................................... 10-278723
Sep. 30, 1998 (JP) .......................................... 10-278725

(51) Int. Cl.$^7$ ............................................. G06F 17/30
(52) U.S. Cl. ...................... 707/3; 707/2; 707/4; 707/5; 707/6; 707/10
(58) Field of Search .............................. 707/3, 2, 4, 5, 707/10, 6

(56) References Cited

U.S. PATENT DOCUMENTS

| | | | |
|---|---|---|---|
| 5,778,368 A | 7/1998 | Hogan et al. ................. | 707/10 |
| 5,842,206 A | 11/1998 | Sotomayor ..................... | 707/5 |
| 5,884,309 A | 3/1999 | Vanechanos, Jr. ............ | 707/10 |
| 5,893,092 A | 4/1999 | Driscoll ......................... | 707/5 |
| 5,893,095 A * | 4/1999 | Jain et al. ....................... | 707/6 |
| 5,983,237 A * | 11/1999 | Jain et al. .................... | 707/104 |
| 6,078,916 A | 6/2000 | Culliss .......................... | 707/5 |
| 6,085,186 A | 7/2000 | Christianson et al. ......... | 707/3 |
| 6,088,692 A | 7/2000 | Driscoll ......................... | 707/5 |
| 6,102,969 A | 8/2000 | Christianson et al. ......... | 717/8 |
| 6,122,628 A | 9/2000 | Castelli et al. ................. | 707/5 |
| 6,122,647 A | 9/2000 | Horowitz et al. ........... | 707/513 |
| 6,175,829 B1 | 1/2001 | Li et al. ........................ | 707/3 |
| 6,182,068 B1 | 1/2001 | Culliss .......................... | 707/5 |
| 6,226,636 B1 * | 5/2001 | Adel-Mottaleb et al. ....... | 707/4 |
| 6,249,784 B1 | 6/2001 | Macke et al. .................. | 707/3 |
| 6,347,313 B1 | 2/2002 | Ma et al. ....................... | 707/3 |

OTHER PUBLICATIONS

Mukherjea, Sougata et al., "Visualizing World–Wide Web Search Engine Results", Proceedings of the 1999 IEEE International Conference on Information Visualization, Jul. 14–16, 1999, pp. 400–405.

Yanai, Keiji, "An Automatic Image–Gathering System for the World–Wide Web by Integration of Keywords and Image Features", Proceedings, Fourth International Conference on Computational Intelligence and Multimedia Applications, Oct. 2001, pp. 303–307.

Chung–Sheng Li, Mohan, R., Smith, J.R., Multimedia Content description in the InfoPyramid,. Proceedings of the 1998 IEEE International Conference on Acoustics, Speech and Signal Processing Volume; 6, May 12–15, 1998, pp.: 3789–3792.

Hjelsvold, R., Midtsraum, R., Sandsta, O., Searching and browsing a Shared Video Database, Proceedings., International Workshop on Multi–Media Database Management Systems, 1995., Aug. 28–30, 1995, pp.: 90–98.

Wittenburg, T.M., Little, T.D.C., An adaptive document management System for Shared Multimedia Data. Proceedings of the International Conference on Multimedia Computing and Systems, 1994., May 15–19, 1994; pp.: 245–254.

* cited by examiner

*Primary Examiner*—Frantz Coby
(74) *Attorney, Agent, or Firm*—Fitzpatrick, Cella, Harper & Scinto

(57) ABSTRACT

An image search apparatus acquires associative words in relation to an input query word, and makes a keyword search of image information on the basis of the obtained associative words and input query word. Parallel to the keyword search, the apparatus acquires a query word and sensory patterns corresponding to the query word, and makes a feature amount search using the feature amounts of the obtained sensory patterns. A search result integration process integrates these search results at weight ratios which are set in advance to obtain final search results. In this manner, the multimedia information wanted can be accurately extracted with respect to the input query word.

23 Claims, 22 Drawing Sheets

FIG. 6

| IMAGE ID | IMAGE CONTENT WORD |
|---|---|
| ... | ... |
| 1024 | TABLELAND, BLUE SKY, CLOUD, MOUNTAIN |
| 1025 | SKY, SUN, CLOUD |
| 1026 | SKY, SEA, HORIZON |
| ... | ... |

FIG. 7

| IMAGE CONTENT WORD | IMAGE ID |
|---|---|
| ... | ... |
| BLUE SKY | 988, 1020, 1024 |
| SEA | 867, 888, 1026, 1347 |
| CLOUD | 991, 1024, 1025, 1078 |
| TABLELAND | 1024 |
| SKY | 777, 778, 1025, 1026 |
| SUN | 1025, 1066 |
| MOUNTAIN | 1024, 1111, 1112, 1113, 1115 |
| ... | ... |

FIG. 8

| INDEX WORD | SEARCH PERSPECTIVE | ANTITHETIC CONCEPT | ASSOCIATED WEIGHT | SENSORY PATTERN WEIGHT |
|---|---|---|---|---|
| ... | ... | ... | ... | ... |
| REFRESHING | CHARACTER DESCRIPTION | SHABBY | 8 | 2 |
| REFRESHING | LANDSCAPE | HEAVY | 3 | 7 |
| REFRESHING | TASTE | THICK | 9 | 1 |
| REFRESHING | GENERAL ATMOSPHERE | | 5 | 5 |
| ... | ... | ... | ... | ... |
| MILD | COLOR TONE | SHOWY | 2 | 8 |
| MILD | TASTE | | 9 | 1 |
| MILD | GENERAL ATMOSPHERE | | 5 | 5 |
| ... | ... | ... | ... | ... |
| SIMPLE | GENERAL ATMOSPHERE | URBAN | 5 | 5 |
| SIMPLE | COLOR TONE | SHOWY | 3 | 7 |
| ... | ... | ... | ... | ... |
| SMOOTH | FEEL | SANDY | 7 | 3 |
| SMOOTH | TEXTURE | SANDY | 5 | 5 |
| SMOOTH | GENERAL ATMOSPHERE | SANDY | 6 | 4 |
| ... | ... | ... | ... | ... |

FIG. 9

| ASSOCIATIVE ID | INDEX WORD | ASSOCIATIVE WORD | ASSOCIATIVE PERSPECTIVE | ASSOCIATION STRENGTH |
|---|---|---|---|---|
| ... | ... | ... | ... | ... |
| 58790 | REFRESHING | ATHLETE | CHARACTER DESCRIPTION | 6 |
| 58791 | REFRESHING | NICE GUY | CHARACTER DESCRIPTION | 5 |
| 58792 | REFRESHING | SUMMER RESORT | LANDSCAPE | 6 |
| 58793 | REFRESHING | TABLELAND | LANDSCAPE | 7 |
| 58794 | REFRESHING | BLUE SKY | LANDSCAPE | 8 |
| 58795 | REFRESHING | LEMON | TASTE | 6 |
| 58796 | REFRESHING | SODA | TASTE | 4 |
| 58797 | REFRESHING | SHOWER | GENERAL ATMOSPHERE | 5 |
| ... | ... | ... | ... | ... |
| 71238 | MILD | TEA | TASTE | 7 |
| 71239 | MILD | WINE | TASTE | 2 |
| 71240 | MILD | EARTH COLOR | COLOR TONE | 4 |
| ... | ... | ... | ... | ... |
| 126531 | SIMPLE | COUNTRY | GENERAL ATMOSPHERE | 5 |
| 126532 | SIMPLE | LOCAL STYLE COOKING | GENERAL ATMOSPHERE | 5 |
| 126533 | SIMPLE | FOLKCRAFT ARTICLE | GENERAL ATMOSPHERE | 6 |
| 126534 | SIMPLE | SPACE SHUTTLE | GENERAL ATMOSPHERE | −8 |
| 126535 | SIMPLE | SPORT CAR | GENERAL ATMOSPHERE | −8 |
| 126536 | SIMPLE | CHANDELIER | GENERAL ATMOSPHERE | −9 |
| ... | ... | ... | ... | ... |
| 234099 | SMOOTH | VELVETY SKIN | FEEL | 3 |
| 234100 | SMOOTH | VELVET | FEEL | 6 |
| 234101 | SMOOTH | LUSTER | TEXTURE | 5 |
| ... | ... | ... | ... | ... |

FIG. 10

| FOUND IMAGE ID | NUMBER OF MATCHED ASSOCIATIVE WORDS | ASSOCIATIVE WORD ID LIST | ASSOCIATIVE MATCHING LEVEL | NUMBER OF MATCHED SENSORY PATTERNS | SENSORY PATTERN ID LIST | SENSORY PATTERN MATCHING LEVEL | INTEGRATED MATCHING LEVEL |
|---|---|---|---|---|---|---|---|
| | | | | | | | |
| | | | | | | | |
| | | | | | | | |
| | | | | | | | |
| | | | | | | | |
| | | | | | | | |
| | | | | | | | |

FIG. 11
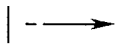

FIG. 12

| IMAGE WORD | ASSOCIATIVE WORD | SENSORY PATTERN ID |
|---|---|---|
| REFRESHING | FOREST | 005 |
| REFRESHING | FOREST | 006 |
| REFRESHING | TABLELAND | 007 |
| REFRESHING | BLUE SKY | 012 |
| REFRESHING | BLUE SKY | 015 |
| REFRESHING | SEA | 016 |
| REFRESHING | | 020 |
| NOT REFRESHING | | 001 |
| NOT REFRESHING | | 010 |
| TROPICAL | SEA | 023 |
| TROPICAL | FRUIT | 052 |
| TROPICAL | FRUIT | 053 |
| TROPICAL | ... | ... |
| ... | ... | ... |

FIG. 14

PHYSICAL IMAGE FEATURE ($X_1 \sim X_n$)

|     | $X_1$ | $X_2$ | $X_3$ | $X_4$ | $X_5$ | $X_6$ | ... | $X_n$ |
|-----|-------|-------|-------|-------|-------|-------|-----|-------|
| B1  | x11   | x12   | X13   | X14   | X15   | X16   |     | X1n   |
| B2  | x21   | x22   | x23   | x24   | x25   | x26   |     | x2n   |
| B3  | x31   | x32   | x33   | x34   | x35   | x36   |     | x3n   |
| B4  | x41   | x42   | x43   | x44   | x45   | x46   |     | x4n   |
| B5  | x51   | x52   | x53   | x54   | x55   | x56   |     | x5n   |
| ⋮   |       |       |       |       |       |       |     |       |
| Bm  | xm1   | xm2   | xm3   | xm4   | xm5   | xm6   |     | xmn   |

B1···Bm : REGION OR BLOCK NO.

FIG. 15

CHROMATIC IMAGE FEATURE AMOUNT

| | REGION OR BLOCK NO. (B1 ... Bn) | | | | |
|---|---|---|---|---|---|
| | B1 | B2 | B3 | ... | Bn |
| REPRESENTATIVE COLOR | $C_1(R_1, G_1, B_1)$ | $C_2(R_2, G_2, B_2)$ | $C_3(R_3, G_3, B_3)$ | ... | $C_n(R_n, G_n, B_n)$ |
| FEATURE AMOUNT | $c_1$ | $c_2$ | $c_3$ | ... | $c_n$ |

FIG. 16

| IMAGE ID | B1 | | ... | Bm | |
| --- | --- | --- | --- | --- | --- |
| | REPRESENTATIVE COLOR | FEATURE AMOUNT | | REPRESENTATIVE COLOR | FEATURE AMOUNT |
| IMAGE 001 | C11 (R11, G11, B11) | c11 | ... | C1m (R1m, G1m, B1m) | c1m |
| IMAGE 002 | C21 (R21, G21, B21) | c21 | ... | C2m (R2m, G2m, B2m) | c2m |
| ... | ... | ... | ... | ... | ... |
| IMAGE n | Cn1 (Rn1, Gn1, Bn1) | cn1 | ... | Cnm (Rnm, Gnm, Bnm) | cnm |

BLOCK OR REGION NO.

FIG. 17

| SENSORY PATTERN ID | CHROMATIC FEATURE AMOUNT | | | | | | | | | |
|---|---|---|---|---|---|---|---|---|---|---|
| | COLOR 1 | | | COLOR 2 | | | ... | COLOR m | | |
| | R | G | B | R | G | B | | R | G | B |
| PATTERN 1 | 255 | 0 | 0 | 255 | 255 | 0 | | 0 | 0 | 0 |
| PATTERN 2 | 153 | 153 | 61 | 255 | 255 | 255 | | 161 | 179 | 89 |
| ... | | | | | | | | | | |
| PATTERN n | 102 | 255 | 255 | 255 | 255 | 255 | | 102 | 179 | 255 |

INFORMATION SEARCH APPARATUS AND METHOD

BACKGROUND OF THE INVENTION

The present invention relates to an information search apparatus and method for searching information on the basis of an input query word. More specifically, the present invention relates to an information search apparatus and method for managing a plurality of kinds of multimedia information, and searching the managed multimedia information for desired multimedia information, and a computer readable memory.

A conventional information search apparatus, which searches multimedia information, e.g., image information, makes a search using data (keywords) derived from subjective evaluation results of one or a plurality of persons for test images, physical image features extracted from images, and the like.

When an image is searched for using a keyword, a required image is obtained by matching a given keyword with that corresponding to the image. Also, a scheme for obtaining an image, that cannot be obtained by full-word matching with an input keyword, by matching not only the input keyword but also an associated keyword associated with the input keyword with a keyword corresponding to an image, is proposed. Furthermore, a search scheme which obtains an image with similar color information by detecting a correspondence between the input keyword and color information using, e.g., color information of images is proposed.

In the image search using keywords, an impression that a person receives upon watching an image, or key information linked with the impression is appended to image information and is used in search. As the key information, words that express impressions evoked by images such as "warm", "cold", and the like, and words that represent objects in drawn images such as "kitty", "sea", "mountain", and the like are appended as keywords. Also, local image feature components on drawn images are subjectively evaluated and are often appended as key information. For example, information that pertains to a color such as "red", "blue", and the like, information that pertains to a shape such as "round", "triangular", "sharp", and the like, and information that pertains to a texture such as "sandy", "smooth", and the like are expressed using words and icons, are appended to images as key information, and are used in search.

In a system in which physical image feature amounts are extracted from images, and are used in image search, image features include local colors painted on images, overall color tones, and shapes, compositions, textures, and the like of objects on drawn images. An image feature amount is extracted from segmented regions or blocks obtained by segmenting the overall image into regions based on color information, or segmenting the image into blocks each having a given area, or is extracted from the entire image. Physical image features include, e.g., color information, density distribution, texture, edge, region, area, position, frequency distribution, and the like of an image.

However, in the above search scheme, when an image including a keyword that matches the input query word is searched for, images which do not match the search request of the searcher are often obtained. Especially, when an image search is made using an abstract query word such as a "refreshing" image, images found by the search are limited. To solve this problem, a search may be made by unfolding the query word "refreshing" to keywords which are associated with that query word. However, when such scheme is used, images which are not "refreshing" may be mixed in search results.

In this manner, the operator cannot designate query conditions for obtaining a desired search result with respect to a search request indicated by the input keyword, and cannot obtain an intended search result. For example, even when the operator wants to find only images having "refreshing" feature patterns with respect to a search request "refreshing", images having content words associated from the search request "refreshing" such as a music score of a "refreshing" music, a "refreshing" athlete", and the like, are presented, i.e., images which do not match the search request are presented.

In place of a query word, a query image may be input, and a search may be made using its feature amount. However, in this case, a query image which reflects the searcher's will must be prepared, and it is difficult to select a query image, resulting in poor operability.

SUMMARY OF THE INVENTION

The present invention has been made in consideration of the above-mentioned problems, and has as its object to provide an image search method and apparatus which can extract the information wanted with high precision with respect to an input query word.

In order to achieve the above object, according to one aspect of the present invention, there is provided an information search apparatus for searching information based on an input query word, comprising first search means for determining a query keyword on the basis of the query word, and searching information on the basis of the query keyword, second search means for determining a feature amount corresponding to the query word, and searching information on the basis of the feature amount, setting means for setting a search weight to be assigned to search results of the first and second search means, and integration means for integrating search results obtained by the first and second search means in accordance with the search weight set by the setting means.

In order to achieve the above object, according to another aspect of the present invention, there is provided an information search method for searching information based on an input query word, comprising the first search step of determining a query keyword on the basis of the query word, and searching information on the basis of the query keyword, the second search step of determining a feature amount corresponding to the query word, and searching information on the basis of the feature amount, the setting step of setting a search weight to be assigned to search results in the first and second search steps, and the integration step of integrating search results obtained in the first and second search steps in accordance with the search weight set in the setting step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention

FIG. 6 is a table showing an example of the data structure of an image content word holding unit 219 which stores image IDs in correspondence with image content words;

FIG. 7 is a table which stores data of the image content word holding unit shown in FIG. 6 as a list of image IDs using image content words as keys;

FIG. 8 is a table showing an example of the data structure of a concept discrimination dictionary 205;

FIG. 9 is a table showing an example of the data structure of an associative word dictionary 211;

FIG. 10 is a table for explaining the data holding format in a search result holding unit 216;

FIG. 11 is a table for explaining an example of the data structure of an unfolded sensory pattern holding unit 213 shown in FIG. 2;

FIG. 12 is a table showing an example of the data structure of an image word/sensory pattern correspondence holding unit 215 shown in FIG. 2;

FIG. 14 is a table showing a data example obtained upon extracting image feature amounts from a single image by an image feature amount extraction process;

FIG. 15 is a table showing an example of image feature amounts in this embodiment, which are obtained by extracting representative colors in units of image regions/blocks;

FIG. 16 is a table showing a storage example of an image feature amount holding unit 222 shown in FIG. 2;

FIG. 17 is a table showing a data storage example of an image feature amount/sensory pattern correspondence holding unit 223 shown in FIG. 2;

DESCRIPTION OF THE PREFERRED EMBODIMENTS

The preferred embodiments of the present invention will now be described in detail in accordance with the accompanying drawings.

Figure 1:
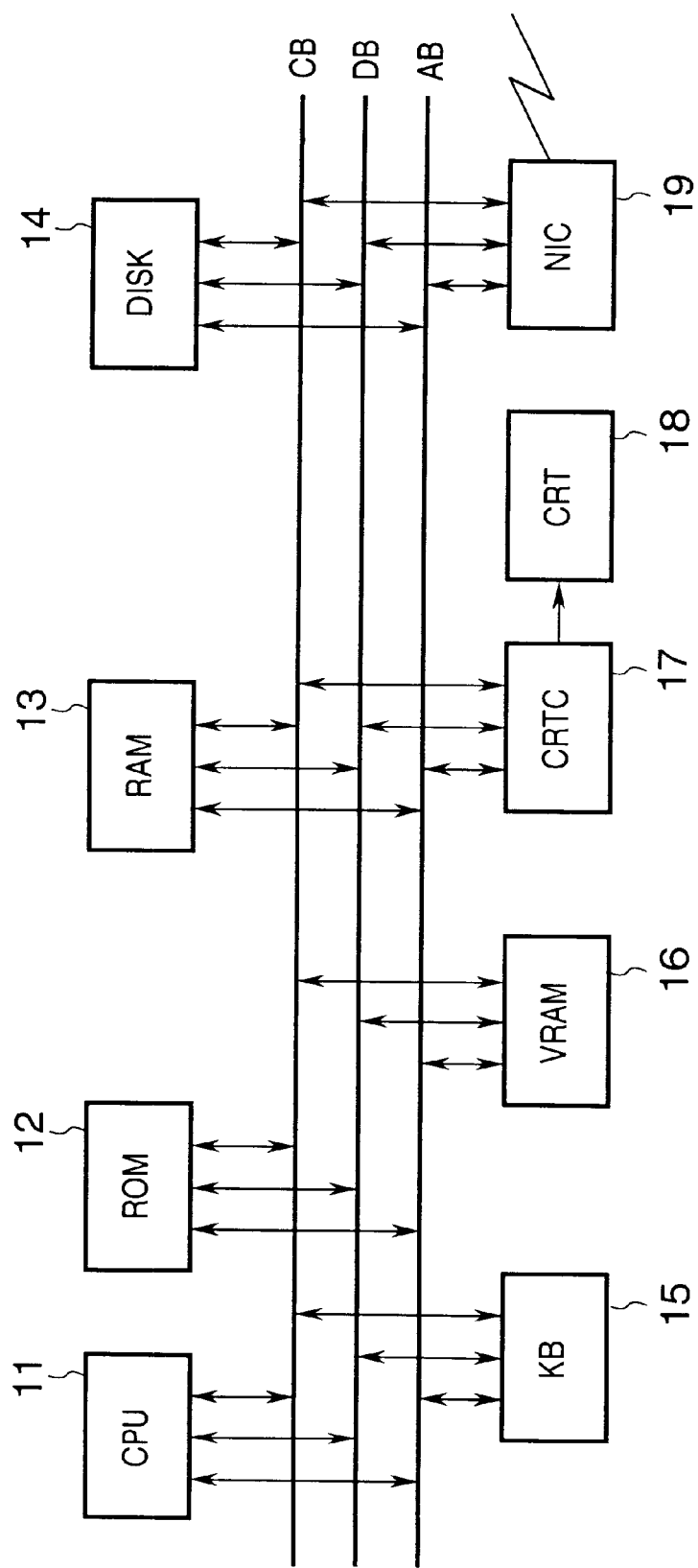
FIG. 1 is a block diagram showing an example of the arrangement of an information processing apparatus which constructs an image search apparatus according to an embodiment of the present invention.

FIG. 1 shows an example of the arrangement of an information processing apparatus which constitutes an image search apparatus according to this embodiment.

Referring to FIG. 1, reference numeral 11 denotes a microprocessor (to be referred to as a CPU hereinafter), which makes computations, logical decisions, and the like for image information search in accordance with control programs, and controls individual building components connected to an address bus AB, control bus CB, and data bus DB via these buses. The address bus AB transfers an address signal indicating the building component to be controlled by the CPU 11. The control bus CB transfers a control signal for each building component to be controlled by the CPU 11. The data bus DB transfers data among the respective building components.

Reference numeral 12 denotes a read-only memory (to be referred to as a ROM hereinafter), which stores a boot processing program and the like executed by the CPU 11 upon starting up the apparatus of this embodiment. Reference numeral 13 denotes a rewritable random access memory (to be referred to as a RAM hereinafter) which is configured by 16 bits per word, and is used as a temporary storage of various data from the respective building components. Especially, in this embodiment, the RAM 13 provides various data holding units such as a query word holding unit 202, search perspective holding unit 203, search weight holding unit 204, determined weight holding unit 207, unfolded associative word holding unit 209, unfolded sensory pattern holding unit 213, and search result holding unit 216, which will be described later with reference to FIG. 2.

Reference numeral 14 denotes an external memory (DISK), which stores a concept discrimination dictionary 205 and associative word dictionary 211, and provides data holding units such as an image word/sensory pattern correspondence holding unit 215, image content word holding unit 219, image holding unit 218, sensory pattern holding unit 220, image feature amount holding unit 222, and image feature amount/sensory pattern correspondence holding unit 223, which will be described later with reference to FIG. 2. As a storage medium of the external memory 14, a ROM, floppy disk, CD-ROM, memory card, magnetooptical disk, or the like can be used.

Figure 2:
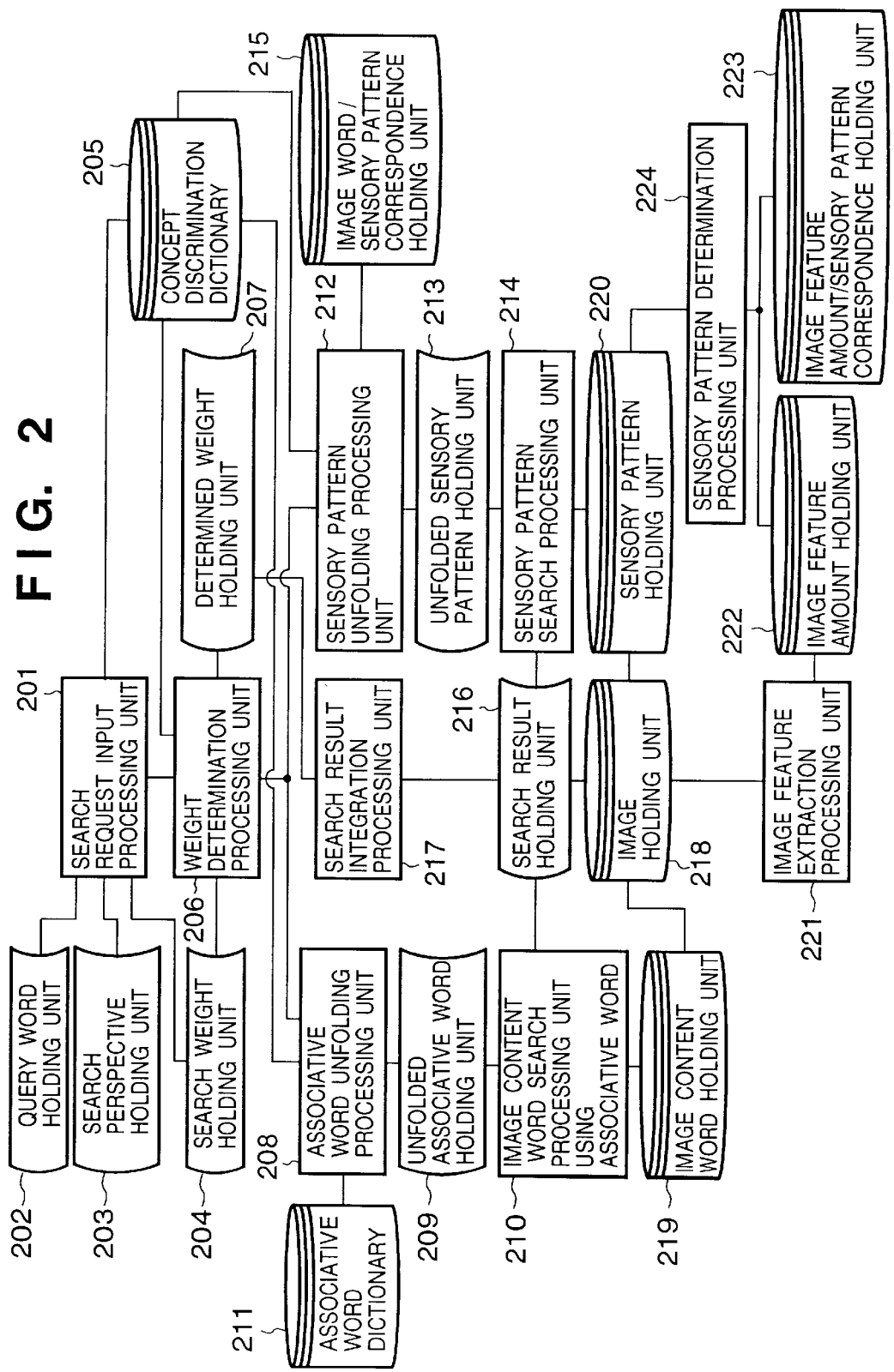
FIG. 2 is a block diagram depicting the processing arrangement in the image search apparatus according to the embodiment of the present invention.

Also, the external memory 14 stores programs for respectively implementing the respective processes, i.e., a search request input process 201, weight determination process 206, associative word unfolding process 208, image content word search unit 210 using associative words, sensory pattern unfolding process 212, sensory pattern search process 214, search result integration process 217, image feature amount extraction process 221, and sensory pattern determination process 224, which will be described later with reference to FIG. 2 and the like. These programs are loaded onto the RAM 13 as needed, and are executed by the CPU 11.

Reference numeral 15 denotes a keyboard (KB) which has alphabet keys, hiragana keys, katakana keys, character symbol input keys for inputting a period, comma, and the like, a search key for instructing a search (a function key on a general keyboard may be used instead), and various function keys such as cursor moving keys for instructing cursor movement, and the like. Also, a pointing device such as a mouse or the like (not shown) may be connected.

Reference numeral 16 denotes a display video memory (to be referred to as VRAM hereinafter) for storing a pattern of data to be displayed. Reference numeral 17 denotes a CRT controller (to be referred to as a CRTC hereinafter) for displaying the contents stored in the VRAM 16 on a CRT 18. Reference numeral 18 denotes a display device (CRT) using, e.g., a cathode ray tube, or the like. The dot display pattern and cursor display on the CRT 18 are controlled by the CRTC 17. Note that various other displays such as a liquid crystal display, and the like may be used as the display device. Reference numeral 19 denotes a network controller (NIC), which connects the image search apparatus of this embodiment to a network such as Ethernet or the like.

The image search apparatus of this embodiment constituted by the aforementioned building components operates in accordance with various inputs from the keyboard 15 an various inputs supplied from the network controller via the network. Upon receiving the input from the keyboard 15 or network controller 19, and interrupt signal is set to the CPU 11. Upon receiving the interrupt signal, the CPU 11 reads out various control data stored in the external memory 14, and executes various kinds of control in accordance with these control data. Also, the present invention is achieved by supplying a storage medium that stores a program according to the present invention to a system or apparatus, and by reading out and executing program codes stored in the storage medium by a computer of the system or apparatus.

FIG. 2 is a block diagram depicting the processing arrangement in the image search apparatus of this embodiment.

Referring to FIG. 2, reference numeral 201 denotes a search request input process for inputting query items (query word, search perspective or category, and search weight in this embodiment; to be described in detail later) that pertain to the information wanted. Reference numeral 202 denotes a query word holding unit for storing a query word input by the search request input process 201. Reference numeral 203 denotes a search perspective holding unit for storing a search perspective input by the search request input process 201. Reference numeral 204 denotes a search weight holding unit for storing a search weight input by the search request input process 201.

Reference numeral 205 denotes a concept discrimination dictionary having a search perspective that pertains to a concept as information wanted, an antithetic concept having a meaning contrary or antonymous to the concept as the information wanted, and two kinds of coefficients (associated weight and sensory pattern weight) for weight discrimination upon searching for a concept, as shown in FIG. 8. Note that the concept discrimination dictionary 205 will be described in detail later with reference to FIG. 8. Reference numeral 206 denotes a weight determination process for giving weights (associated weight and sensory pattern weight) indicating the weight balance on associative words (obtained by an associative word unfolding processing unit 208) and sensory patterns (obtained by a sensory pattern unfolding processing unit 212) in actual search using a query word stored in the query word holding unit 202. Reference numeral 207 denotes a determined weight holding unit for holding the search weight determined by the weight determination process 206.

Reference numeral 208 denotes an associative word unfolding process for unfolding the query word stored in the query word holding unit 202 into associative words with reference to an associative word dictionary 211, obtaining an antithetic concept antonymous to that query word from the concept discrimination dictionary 205, and unfolding the obtained antithetic concept into associative words with reference to the associative word dictionary 211. Reference numeral 209 denotes an unfolded associative word holding unit for holding the associative words (including those of the antithetic concept) unfolded by the associative word unfolding process 208. Reference numeral 210 denotes an image content word search process using associative words (to be referred to as an image content word search process hereinafter), which finds image content words, that are stored in an image content word holding unit 219 and match the unfolded associative words, by search with reference to the unfolded associative word holding unit 209. Reference numeral 211 denotes an associative word dictionary for storing associative words in units of concepts serving as index words in correspondence with associative perspectives (this process will be described in more detail later with reference to FIG. 9).

Reference numeral 212 denotes a sensory pattern unfolding process for unfolding the query word stored in the query word holding unit 202 into sensory patterns with reference to an image word/sensory pattern correspondence holding unit 215, obtaining an antithetic concept antonymous to that query word from the concept discrimination dictionary 205, and unfolding the obtained antithetic concept into sensory patterns with reference to the image word/sensory pattern correspondence holding unit 215.

Reference numeral 213 denotes an unfolded sensory pattern holding unit for temporarily storing the sensory patterns unfolded by the sensory pattern unfolding process 212. Storage of data in the unfolded sensory pattern holding unit 213 will be described later with reference to FIG. 11. Reference numeral 214 denotes a sensory pattern search process for finding sensory patterns, which are stored in the sensory pattern holding unit 220 and are similar to the unfolded sensory patterns, by search with reference to the sensory pattern holding unit 220.

Reference numeral 215 denotes an image word/sensory pattern correspondence holding unit for storing the correspondence between the image words and sensory patterns by storing sensory pattern IDs corresponding to sets of image words and associative words associated with the image words. Note that the image word/sensory pattern correspondence holding unit 215 will be described in detail later with reference to FIG. 12.

Reference numeral 216 denotes a search result holding unit for storing image IDs found by searches of the image content word search process 210 and sensory pattern search process 214. Reference numeral 217 denotes a search result integration process for integrating the search results of image content words using the associative words, and the search results of sensory patterns stored in the search result holding unit 216, on the basis of the search weights obtained by the weight determination process 206 and stored in the determined weight holding unit 207.

Reference numeral 218 denotes an image holding unit for storing image information serving as test images. Reference numeral 219 denotes an image content word holding unit for verbalizing and storing concepts appended to images stored in the image holding unit 218 to express their contents. Reference numeral 220 denotes a sensory pattern holding unit for storing matching levels between image information of the individual images stored in the image holding unit 218 and sensory patterns. More specifically, the sensory pattern holding unit 220 stores the matching levels with sensory patterns in units of image IDs. The data contents of the sensory pattern holding unit 220 will be described later with reference to FIG. 13.

Reference numeral 221 denotes an image feature extraction process for extracting physical image feature amounts from image information stored in the image holding unit 218. Physical image feature amounts are visual features or signatures extracted from regions segmented on the basis of color information, blocks each segmented to have a given area, or the entire image. For example, the image feature is numerical information such as the color distribution or histogram, density distribution, texture, edge, frequency distribution, and the like of an image. Note that the image feature amounts will be described in detail later with reference to FIG. 14.

Reference numeral 222 denotes an image feature amount holding unit for storing the image feature amounts obtained by the image feature amount extraction process 221. Reference numeral 223 denotes an image feature amount/ sensory pattern correspondence holding unit for storing image feature amounts and sensory patterns in correspondence with each other. The image feature amount/sensory pattern corresponding holding unit 223 stores sensory pattern IDs and image feature amount data corresponding to those IDs. Note that the data structure of the image feature amount/sensory pattern correspondence holding unit 223 will be described in detail later with reference to FIG. 17.

Reference numeral 224 denotes a sensory pattern determination process for comparing image feature amounts extracted from a sensory pattern and image information and determining their matching level with reference to the image feature amount holding unit 222 and image feature amount/ sensory pattern correspondence holding unit 223, and registering the result in the aforementioned sensory pattern holding unit 220.

A display example of a search perspective that pertains to search request items input at the search request input processing unit 201 will be explained below with reference to FIG. 3.

Figure 3:
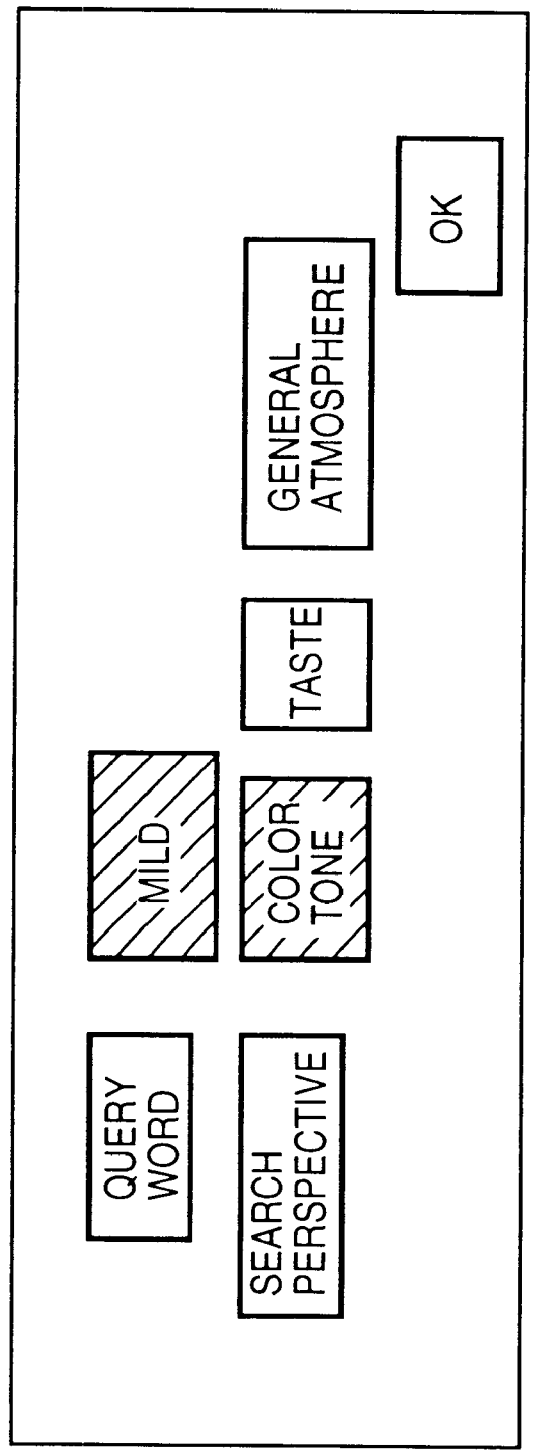
FIG. 3 is a view showing a display example of search perspectives in association with a search request word input in a search request input process 201.

FIG. 3 shows a display example of search perspectives in association with the query word input by the search request input process 201. When a query word is input by operating, e.g., the keyboard 15, the concept discrimination dictionary 205 shown in FIG. 8 is searched using the query word as an index word to extract corresponding search perspectives. FIG. 3 illustrates that three search perspectives "color tone", "taste", and "general atmosphere" are available in relation to a query word "mild", and hatched "color tone" is selected as the search perspective. When the user presses (clicks) an OK button in this state, the search perspective "color tone" is selected, and is held in the search perspective holding unit 203.

By pressing one of the cursor moving keys on the keyboard 15, the hatching moves from "color tone" to "taste" or "general atmosphere", and the user can designate a desired search perspective or category. Note that "mild" as the query word is held in the query word holding unit 202, and the selected search perspective ("color tone" in FIG. 3) is held in the search perspective holding unit 203.

A display example on the control panel when the operator instructs the search weight balance on a search using associative words and a search using sensory patterns in actual search will be explained below with reference to FIG. 4.

Figure 4:
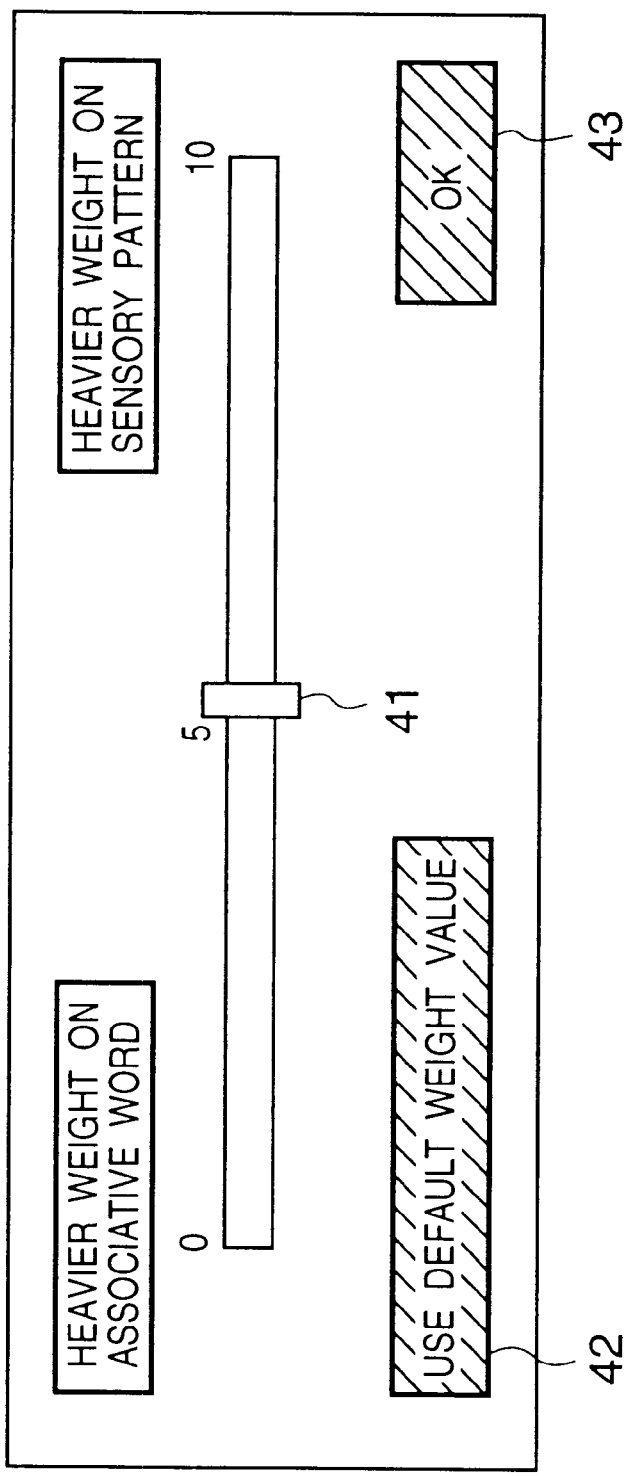
FIG. 4 is a view showing a display example of a weight designation control panel for designating a search weight for a search using associative words, and a search weight for a search using sensory patterns, in the search request word input in a search request input process 201.

FIG. 4 shows a display example of a weight designation control panel for instructing search weights for searches using associative words and sensory patterns in the search request input process 201. As described above, in this embodiment, a search using associative words and a search using the feature amounts of images (sensory patterns) based on the query word are made, and the search results are integrated. In this integration process, the two search results are weighted. On the weight designation control panel, the user can designate a search weight for a search using associative words, and that for a search using sensory patterns. That is, the user can designate the weight balance on a search using associative words or that using sensory patterns in actual search.

Referring to FIG. 4, when the user slides a slide button 41 to the left, an instruction that sets a heavier weight on a search using associative words is issued; when he or she slides the slide button 41 to the right, an instruction that sets a heavier weight on a search using sensory patterns is issued. When the user designates search weights using the slide button 41 and then presses an OK button 43, a search weight instruction is issued. Note that a button 42 is pressed when no, search weights are clearly designated. Upon depression of the button 42, predetermined weight values (which are obtained from an associated weight 83 and sensory pattern weight 84 in the concept discrimination dictionary 205 (FIG. 8)) are used. The set weights are stored in the search weight holding unit 204. Note that the buttons 41 to 43 on the control panel may be clicked by a pointing device (not shown).

The structure of the image holding unit 218 will be described below using FIG. 5.

Figure 5:
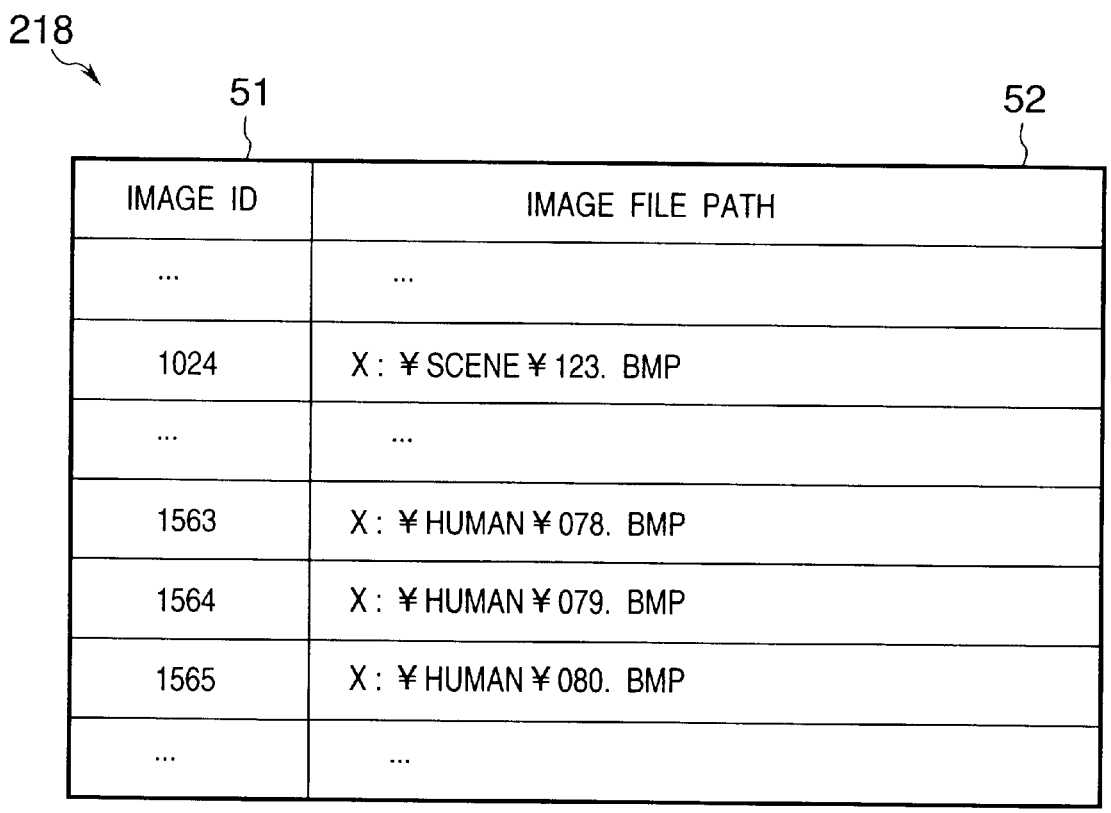
FIG. 5 is a table showing the data structure of an image holding unit 218 which stores image IDs in correspondence with image file storage paths.

FIG. 5 shows the data structure of the image holding unit 218 which stores image IDs in correspondence with image file storage paths. Referring to FIG. 5, reference numeral 51 denotes an image ID which is an identification number uniquely assigned to one image file in this image database. Reference numeral 52 denotes a file path which indicates the storage location of an image file corresponding to the image ID in the external memory 14, and corresponds to the directory and file of MS-DOS.

An image file is divided into header and image data fields (not shown in FIG. 5). The header field stores information required for reading data from that image file, and additional information that explains the image contents. As such information, an image format identifier indicating the image format name of the image, file size, image width, height, and depth, the presence/absence of compression, color pallet information, resolution, offset to the storage location of image data, and the like are stored. The image data field stores image data in turn. This embodiment uses the BMP format of Microsoft Corp. as such image format, but other compression formats such as GIF, JPEG, FlashPix, and the like may be used.

The structure of the image content word holding unit 219 will be described below with the aid of FIG. 6.

FIG. 6 shows an example of the data structure of the image content word holding unit 219 which stores image IDs in correspondence with image content words. Referring to FIG. 6, reference numeral 61 denotes an image ID, which corresponds to the image ID 51 in FIG. 5. Reference numeral 62 denotes an image content word which stores a word for expressing each image identified by the image ID 61. The image content word is a keyword which verbally expresses an image feature in an image, and is stored as a character code (e.g., unicode). A plurality of keywords may be stored per image, and the image content word holding unit 219 is constructed as a list of image content words 62 using image IDs 61 as keys.

FIG. 7 shows a table which stores the data of the image content word holding unit shown in FIG. 6 as a list of image IDs using image content words as keys. Referring to FIG. 7, all image IDs that contain image content words 71 as keywords are stored as image IDs 72.

The structure of the concept discrimination dictionary 205 will be described below using FIG. 8.

FIG. 8 shows an example of the data structure of the concept discrimination dictionary 205. The concept discrimination dictionary 205 provides information that pertains to a query word serving as a search request, and is a table which stores index words 80 corresponding to query words, search perspectives 81 associated with index words, antithetic concepts 82 having meanings contrary to the index words in units of search perspectives, associative word weights 83 used upon searching the index words, and sensory pattern weights 84 used upon searching the index words in correspondence with each other.

The structure of the associative word dictionary 211 will be explained below with reference to FIG. 9.

FIG. 9 shows an example of the data structure of the associative word dictionary 211. The associative word dictionary 211 is composed of associative IDs 90 each of which assigns a unique number to a set of associative words for each index word, index words 91 each serving as a start point of association, associative words 92 evoked by the index words 91, associative perspectives 93 which are relevant to associations of the associative words 92, and association strengths 94 each indicating the strength of association between each pair of index word 91 and associative word 92.

In this embodiment, the association strength 94 assumes an absolute value ranging from 0 to 10, and its sign indicates direction of association of the associative word. More specifically, when the association strength is a positive value, it indicates a stronger associative relationship (higher bilateral association) as the association strength value is larger; when the association strength is a negative value, it indicates a harder associative relationship as the association strength value is larger. For example, an associative word "folkcraft article" corresponding to an index word "simple" in associative data with the associative ID=126533 can be associated with strength "6", but an associative word "chandelier" in associative data with the associative ID=126536 is hardly associated with strength "9" since its association strength is a negative value.

The structure of the search result holding unit 216 will be described below with reference to FIG. 10.

FIG. 10 shows the data holding format in the search result holding unit 216. As described above, the search result holding unit 216 stores image IDs which are found by searches of the image content word search process 210 using associative words and the sensory pattern search process 214.

Referring to FIG. 10, reference numeral 100 denotes a field for storing image IDs found by search; 101, a field for storing the number of matched associative words with positive association strengths by the image content word search process 217. An associative word ID list 102 stores a maximum of 20 associative word IDs 90 (FIG. 9) of matched associative words in the associative word dictionary 211. When the number 101 of matched associative words is zero, the associative ID 102 is filled with NULL code. Reference numeral 103 denotes a field for storing associative matching levels of associative words with respect to the image IDs 100. When the number 101 of matched associative words is zero, the association matching level 103 also stores zero.

Reference numeral 104 denotes a field for storing the number of sensory patterns with highest similarity, which are found by search by the sensory pattern search process 223. Reference numeral 105 denotes a sensory pattern ID list which stores a maximum of 20 sensory pattern IDs of matched sensory patterns. When the number 104 of matched sensory patterns is zero, the sensory pattern ID 105 is filled with NULL code. Reference numeral 106 denotes a field for storing the search matching level of a sensory pattern search with respect to the image ID 100. When the number 104 of matched sensory patterns is zero, the sensory pattern matching level 106 stores zero. Reference numeral 107 denotes a field for storing an integrated matching level (obtained by the search result integration process 217) of the image ID 100 with respect to the search request, which is calculated using the associative matching level 103 and sensory pattern matching level 106 as parameters.

The structure of the above-mentioned unfolded sensory pattern holding unit 213 will be described in detail below with reference to FIG. 11.

FIG. 11 is a table for explaining an example of the data structure of the unfolded sensory pattern holding unit 213 shown in FIG. 2. Referring to FIG. 11, reference numeral 110 denotes an image word as an unfolding source from which this sensory pattern has evolved upon unfolding, and the same image word as that in the query word holding unit 202 is stored. In this embodiment, a character string "refreshing" is stored, and ends with NULL code. Reference numeral 111 denotes the number of sensory patterns obtained by unfolding the image word 110 with reference to the image word/sensory pattern correspondence holding unit 215. For example, when the contents of the image word/sensory pattern correspondence holding unit 215 are as shown in FIG. 12, the number of sensory patterns unfolded from the image word "refreshing" is 7. Reference numeral 112 denotes an address indicating the storage location area of data obtained by actually unfolding the image word "refreshing". In the example shown in FIG. 11, the storage location address 112 is linked with unfolded data 115 shown in FIG. 11.

In the data 115, data actually unfolded from "refreshing", i.e., sets of associative words and sensory patterns corresponding to the number 111 of sensory patterns are stored. In this embodiment, seven sets of associative words and sensory patterns are stored. For example, an associative word 114 is that of the image word "refreshing" and stores a character string "forest" in this example. Also, a sensory pattern ID 113 corresponds to the image word "refreshing" and its associative word "forest", and stores "5" in this example. The same applies to other sets of associative words and sensory patterns.

The structure of the aforementioned image word/sensory pattern correspondence holding unit 215 will be described in detail below using FIG. 12.

FIG. 12 shows an example of the data structure of the image word/sensory pattern correspondence holding unit 215 in FIG. 2. Referring to FIG. 12, reference numeral 120 denotes an image word serving as an unfolding source of this sensory pattern. In FIG. 12, character strings "refreshing", "tropical", and the like are stored, and end with NULL code. Reference numeral 121 denotes an associative word unfolded from each image word 120. In this embodiment, associative words "forest", "tableland", "blue sky", and the like are stored in correspondence with "refreshing", and these character strings end with NULL code. When no character string is stored in this field 121, i.e., NULL code alone is stored, this sensory pattern applies to all image words "refreshing"; no specific associative word has been designated.

Reference numeral 122 denotes a sensory pattern ID corresponding to the image word 120 and associative word 121. In this embodiment, "005" and "006" are stored as sensory pattern IDs corresponding to the image word "refreshing" and its associative word "forest". Also, sensory patterns for "not refreshing" as an antithetic concept of "refreshing" are stored. In this embodiment, for "not refreshing", no associative words are registered and "001" and "010" are registered as sensory pattern IDs.

The structure of the above-mentioned sensory pattern holding unit 220 will be described in detail below using FIG. 13.

Figure 13:
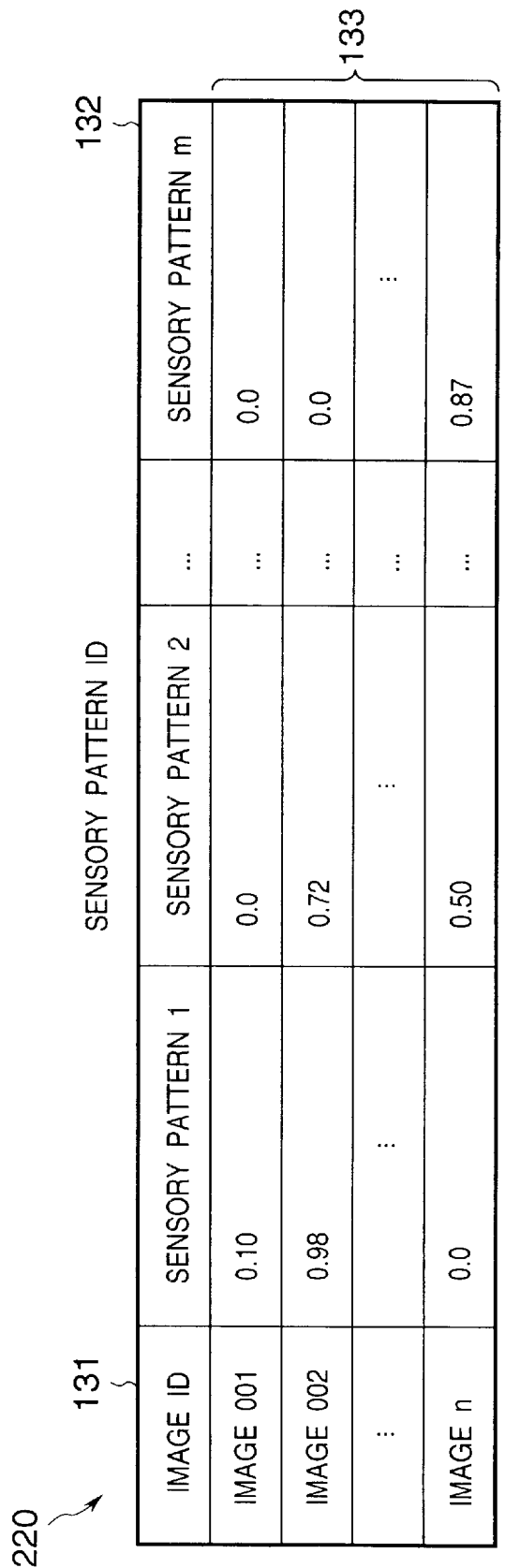
FIG. 13 is a table showing the data structure of a sensory pattern holding unit 220 shown in FIG. 2.

FIG. 13 shows the data structure of the sensory pattern holding unit 220 in FIG. 2. Referring to FIG. 13, reference numeral 131 denotes an image ID for identifying an image to be registered. The image IDs 131 use the same ones as those stored in the image holding unit 218, and uniquely define images in this system. A field 132 stores sensory pattern IDs. In this embodiment, since the matching levels between each image and all sensory patterns stored in the image feature amount/sensory pattern correspondence holding unit 223 are calculated, all the sensory pattern IDs (1 to m) are stored. Reference numeral 133 denotes a numerical value indicating the matching level between each image and sensory pattern. The matching level assumes a value ranging from 0 to 1; 0 indicates the image does not match the sensory pattern at all, and the matching level becomes higher as it is closer to 1. For example, in this embodiment, the matching level between image with the image ID=001 and sensory pattern 1 is 0.10, and the matching level between that image and sensory pattern 2 is 0.

The aforementioned image feature amounts will be explained in detail below with reference to FIG. 14.

FIG. 14 shows a data example obtained upon extracting the image feature amounts from one image by the image feature amount extraction process. In FIG. 14, X1, X2, X3, . . . , Xn represent image features, B1, B2, . . . , Bm represent regions/blocks from which image feature amounts are extracted, and x11 to xmn represent image feature amounts extracted from the individual regions/blocks. That is, feature amounts that pertain to physical image features X1 to Xn are obtained in units of regions/blocks.

FIG. 15 exemplifies a case wherein chromatic image feature amounts are especially extracted. In this case, representative colors are extracted in units of regions or blocks of an image. Referring to FIG. 15, a physical image feature is expressed by "representative color" and "feature amount", representative colors extracted from regions/blocks B1, B2, . . . , Bn are C1(R1, G1, B1), C2(R2, G2, B2), . . . , Cn(Rn, Gn, Bn), and their image feature amounts are c1 to cn.

The structure of the image feature amount holding unit 222 will be described below using FIG. 16.

FIG. 16 shows a storage example of the image feature amount holding unit 222 in FIG. 2. Referring to FIG. 16, reference numeral 161 denotes an image ID for identifying an image to be registered. The image IDs 161 use the same ones as those stored in the image holding unit 218. Reference numeral 162 denotes a block or region number from which an image feature amount is extracted. In this embodiment, B1, B2, . . . , Bm represent the region/block numbers. Reference numeral 163 denotes information (in this embodiment, a representative color is used) indicating an image feature extracted from each region or block (B1, B2, . . . , Bm). This embodiment exemplifies a case wherein chromatic image features are extracted, and for example, a plurality of pieces of information C11(R11, G11, B11), . . . , Cn1(Rn1, Gn1, Bn1) indicating colors are stored. Reference numeral 164 denotes image feature amounts of image features extracted from the individual regions/blocks. In this embodiment, c11, . . . , cn1 are stored as the feature amounts of C11(R11, G11, B11), . . . , Cn1(Rn1, Gn1, Bn1).

The structure of the image feature amount/sensory pattern correspondence holding unit 223 will be described in detail below using FIG. 17.

FIG. 17 shows a data storage example of the image feature amount/sensory pattern correspondence holding unit 223 in FIG. 2. Referring to FIG. 17, reference numeral 171 denotes a sensory pattern ID, which uniquely identifies a sensory pattern. Reference numeral 172 denotes image feature amount data corresponding to each sensory pattern ID. In this embodiment, a sensory pattern is expressed by a chromatic image feature amount, and a combination of color components (values in a color space such as RGB, HVC, or the like) corresponding to each sensory pattern ID is stored. In this embodiment, RGB values assume integers ranging from 0 to 255. A maximum of m colors correspond to each sensory pattern ID.

The sensory pattern determination process 224 calculates the matching levels between each of image data registered in the image holding unit 218 and the respective sensory patterns using the aforementioned image feature amount holding unit 222 and image feature amount/sensory pattern correspondence holding unit 223, and registers them in the sensory pattern holding unit 220 (to be described later in step S87 in FIG. 22).

The processes executed in the image search apparatus of this embodiment with the above arrangement will be described below.

Figure 18:
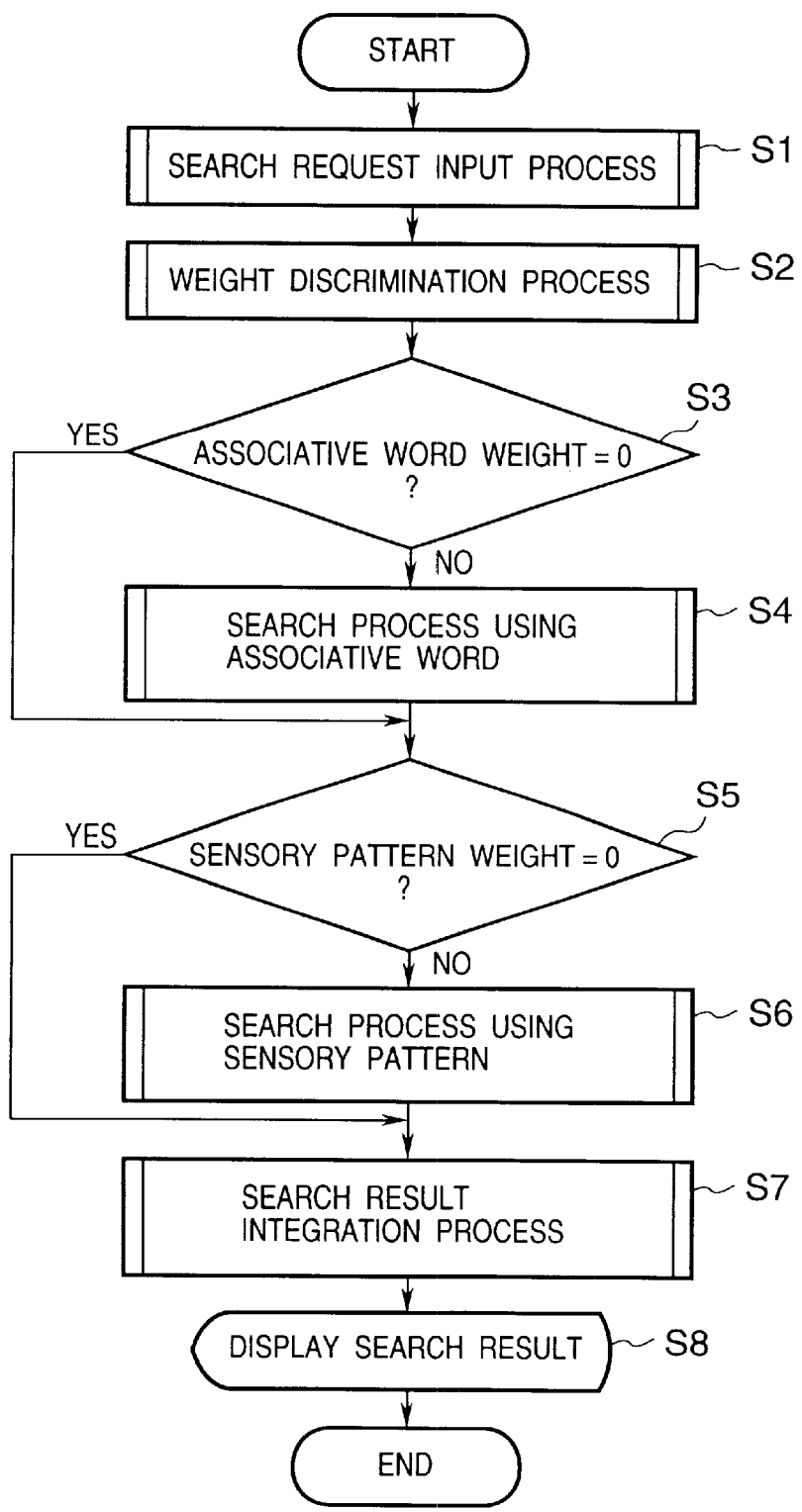
FIG. 18 is a flow chart for explaining the operation of the present invention.

FIG. 18 is a flow chart showing the operation of the image search apparatus of this embodiment. Referring to FIG. 18, step S1 is a processing module that implements the search request input process 201 in FIG. 2, and inputs a search result. Note that the details of this process will be explained in detail later with reference to FIG. 19.

Step S2 is a processing module that implements the weight discrimination process 206, and if it is determined with reference to the contents stored in the search weight holding unit 204 in the search request input process 201 in step S1 that search weights are designated, the designated values are stored in the determined weight holding unit 207. On the other hand, if no search weights are designated, index words 80 are searched for a query word stored in the query word holding unit 202 with reference to the concept discrimination dictionary 205 (FIG. 8) so as to read out a corresponding associated weight 83 and sensory pattern weight 84, and the readout weights are stored in the determined weight holding unit 207. If there is no index word 80 that is relevant to the contents of the query word holding unit 202, a default value "5" is stored as both the associated and sensory pattern weights in the determined weight holding unit 207.

It is checked with reference to the determined weight holding unit 207 in step S3 if the associated weight is zero. If the associated weight is zero, the flow advances to step S5; otherwise, the process in step S4 is executed. Step S4 is a processing module that implements the associative word unfolding process 208 and image content word search process 210 using associative words in FIG. 2, and this process will be described in detail later with reference to FIG. 20.

It is checked with reference to the determined weight holding unit 207 in step S5 if the sensory pattern weight is zero. If the sensory pattern weight is zero, since a search using sensory pattern is unnecessary, the flow advances to step S7; otherwise, the process in step S6 is executed. Step S6 is a processing module that implements the sensory pattern unfolding process 212 and sensory pattern search process 214 in FIG. 2, and will be described in detail later with reference to FIG. 21.

Step S7 is a processing module that implements the search result integration process 217 in FIG. 2, and will be described in detail later with reference to FIG. 22.

In step S8, image files corresponding to image IDs stored in the search result holding unit 216 as search results obtained in step S7 are read out from the image holding unit 218, and are displayed. Note that the search result display process in step S8 is a known one which is prevalent in image search apparatuses of the same type.

Figure 19:
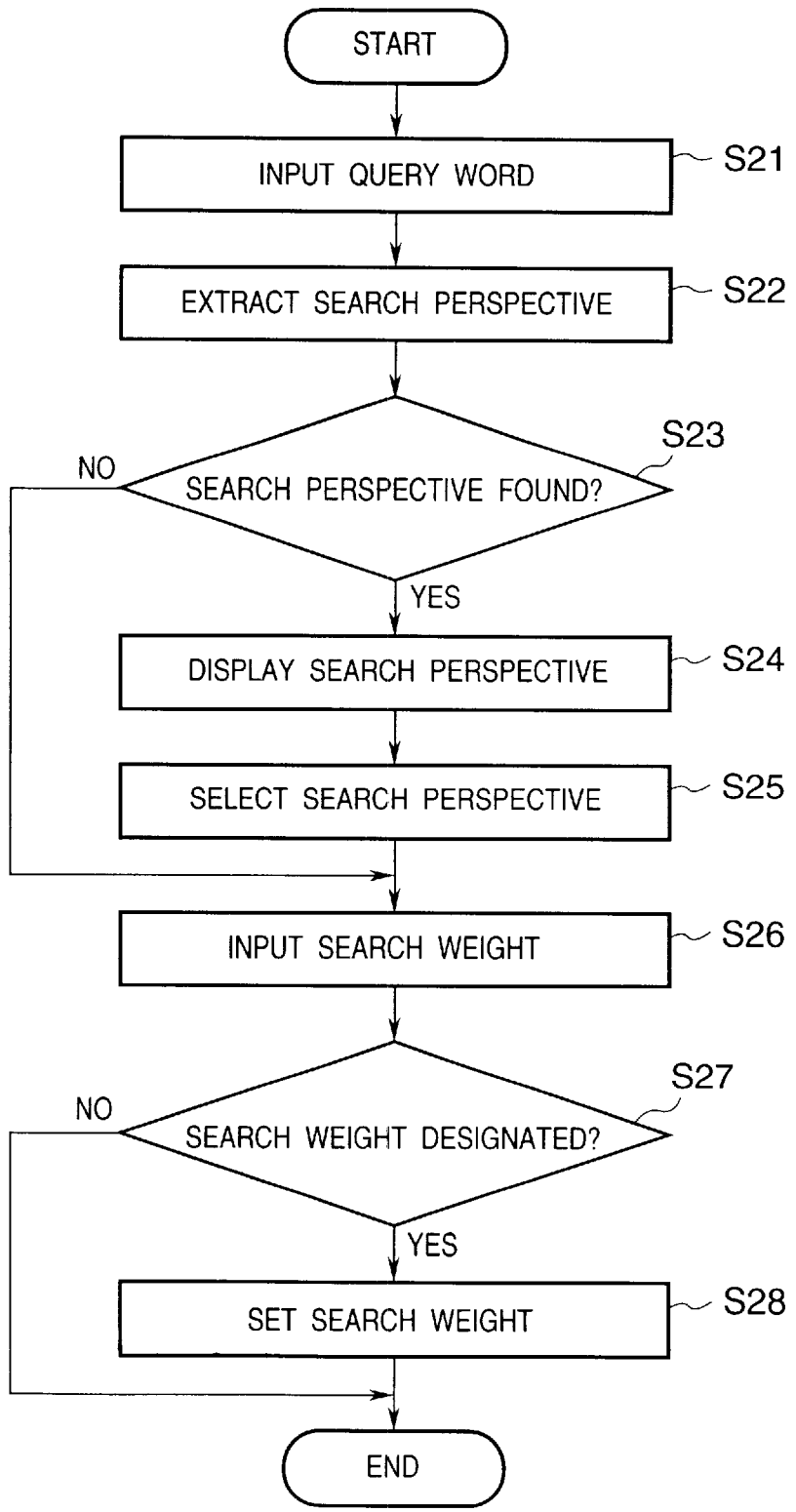
FIG. 19 is a flow chart showing the details of the search request input process 201 (step S1 in FIG. 18)

FIG. 19 is a flow chart showing the details of the search request input process 201 (step S1 in FIG. 18). In step S21, a query word serving as a search request is input. The query word input is attained by storing a character code input at the keyboard 15 in the query word holding unit 202 on the RAM 13.

In step S22, using the query word stored in the query word holding unit 202 as a search request, search perspectives that are relevant to the search request are extracted from the concept discrimination dictionary 205. In this case, all search perspectives corresponding to index words 80 (FIG. 8), which match the query word in the query word holding unit 202, are extracted. For example, when the query word is "mild", three search perspectives "color tone", "taste", and "general atmosphere" can be obtained.

It is checked in step S23 if a search perspective or perspectives is or are found by search perspective extraction in step S22. If a search perspective or perspectives is or are found, the flow advances to step S24; otherwise, the flow advances to step S26.

If search perspectives are found in step S22, they are displayed together with the query word, as in shown in FIG. 3, in step S24. In step S25, the user selects a desired one of the displayed search perspectives using the user interface that has been described previously with reference to FIG. 3. The selected search perspective is stored in the search perspective holding unit 203.

In step S26, the user inputs search weights which determine the weight balance on a search using associative words and a search using sensory pattern in actual search in relation to the search process method in response to the search request. In this embodiment, the user sets the weights using the user interface shown in FIG. 4. That is, the user operates the slide bar shown in FIG. 4 to designate the weight ratios (desired search weights) on associative words and sensory patterns by the length of the horizontal bar of the slider (the position of the button 41). When the user does not designate any search weights, he or she designates use of the default values of the weights shown in FIG. 4.

It is checked in step S27 if search weights are designated. If it is instructed to use the default weight values, the processing ends. On the other hand, if search weights are designated, the flow advances to step S28 to store the designated associative word and sensory pattern weights designated in step S26 in the search weight holding unit 204, thus ending the processing.

Figure 20:
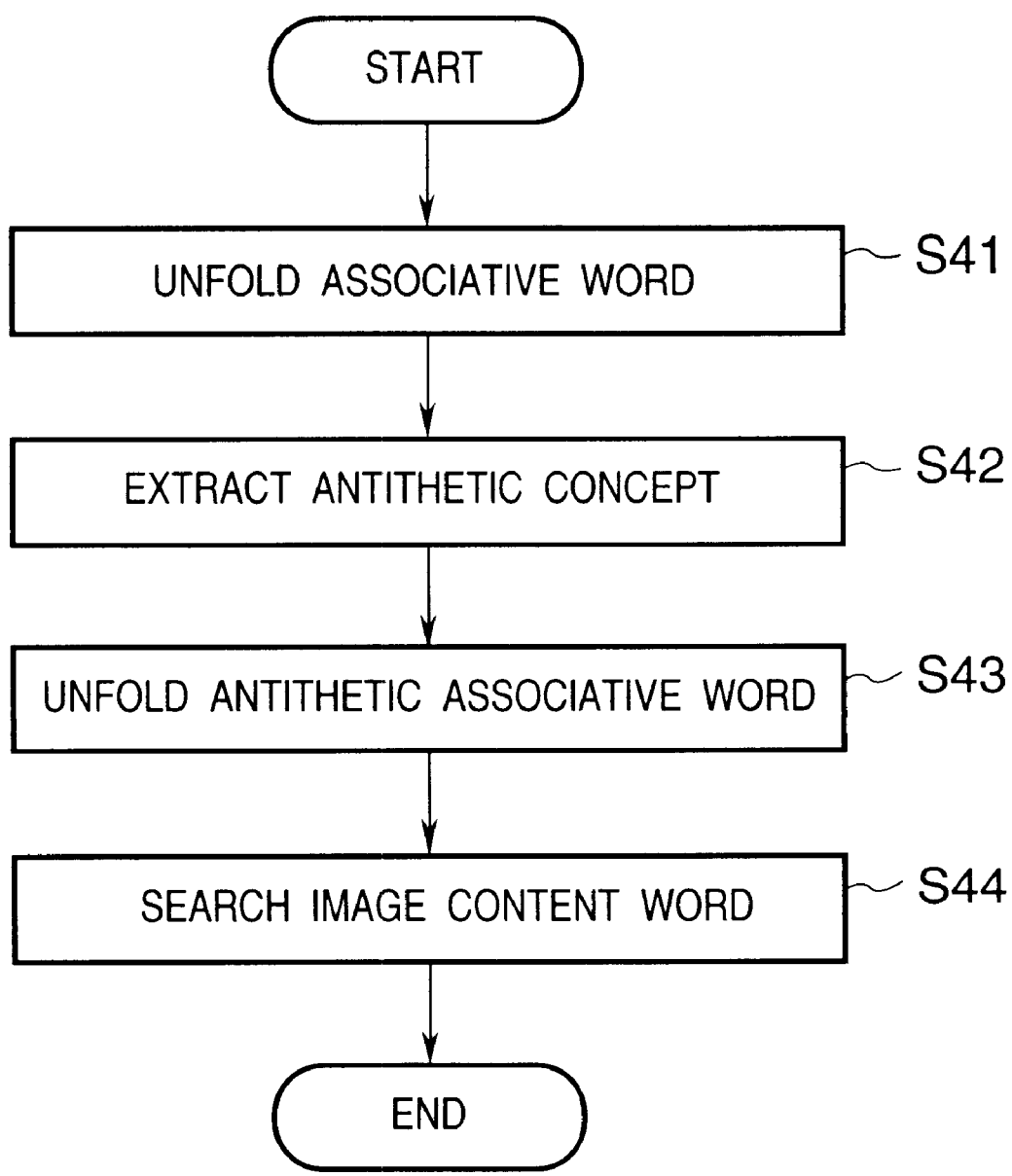
FIG. 20 is a flow chart showing the details of an associative word unfolding process 208 and an image content word search process 210 using associative words (step S4 in FIG. 18)

FIG. 20 is a flow chart showing the details of the associative word unfolding process 208 and the image content word search process 210 using associative words (step S4 in FIG. 18).

Referring to FIG. 20, the associative word dictionary 211 is searched using the query word stored in the query word holding unit 202 to obtain associative word data in step S41. More specifically, the associative word dictionary 211 is searched for index words 91 (FIG. 9), which match the query word, and registered associative word data are extracted. If index words 91 that match the query word are found, all their associative IDs are stored in the unfolded associative word holding unit 209.

In step S42, the concept discrimination dictionary 205 is searched, and if an index word that matches the query word in the query word holding unit 202 is found, a search perspective 81 (FIG. 8) corresponding to that index word is extracted. The extracted search perspective is compared with that stored in the search perspective holding unit 203 in step S25, and if they match, an antithetic concept 82 corresponding to this index word is extracted. On the other hand, if the two search perspectives do not match, data in which the query word matches an index word continues to be searched for. Upon completion of checking for all the extracted search perspectives, the flow advances to step S43.

In step S43, the associative word dictionary 211 is searched for associative words having an index word, which matches the antithetic concept found in step S42. If an index word that match the antithetic concept is found, their associative IDs are stored in the unfolded associative word holding unit 209 by appending a status code indicating an antithetic concept thereto.

In step S44, associative words are extracted based on the associative IDs stored in the unfolded associative word holding unit 209, and the image content word holding unit 219 is searched for image content words that match the associative words. The search results are stored in the search result holding unit 216.

In this process, the associative IDs stored in the unfolded associative word holding unit 209 are extracted, and corresponding associative data are extracted with reference to the associative word dictionary 211. Next, the association strengths 94 of the extracted associative data are extracted, and are set in a work memory ASCF (not shown) on the RAM 13. In this case, if a status code indicating an antithetic concept is appended to a given associative ID extracted from the unfolded associative word holding unit 209, the sign of the association strength is inverted to indicate a negative association strength. However, if the association strength is already a negative value, that associative data is discarded, and the next associative data is checked.

Then, an associative perspective corresponding to each associative ID is extracted, and is compared with that stored in the search perspective holding unit 203. If the two perspectives match, a predetermined value $\alpha$ is set in a work memory VPF (not shown) assured on the RAM 13. If they do not match, a value $\alpha \times 0.1$ is set in the work memory VPF.

Finally, the image content word holding unit 219 is searched for image content words that match associative words corresponding to the associative IDs. It an image content word is found, an image ID corresponding to that image content word is acquired from the image ID 72 (FIG. 7), and is set in the found image ID 100 (FIG. 10) in the search result holding unit 216. "1" is set in the number 101 of matched associative words, and the found associative ID is set in the associative word ID 102. Then, a value obtained by multiplying the value in the work memories ASCF and VPF on the RAM 13 by a predetermined score β based on associative word matching is stored as an associative matching level in the associative matching level 103. If an identical image ID has already been stored, the value of the number 101 of matched associative words is incremented by 1, a new associative word ID is added to the associative word ID 102, and the calculated associative matching level is added to the stored associative matching level 103 to update its value.

Figure 21:
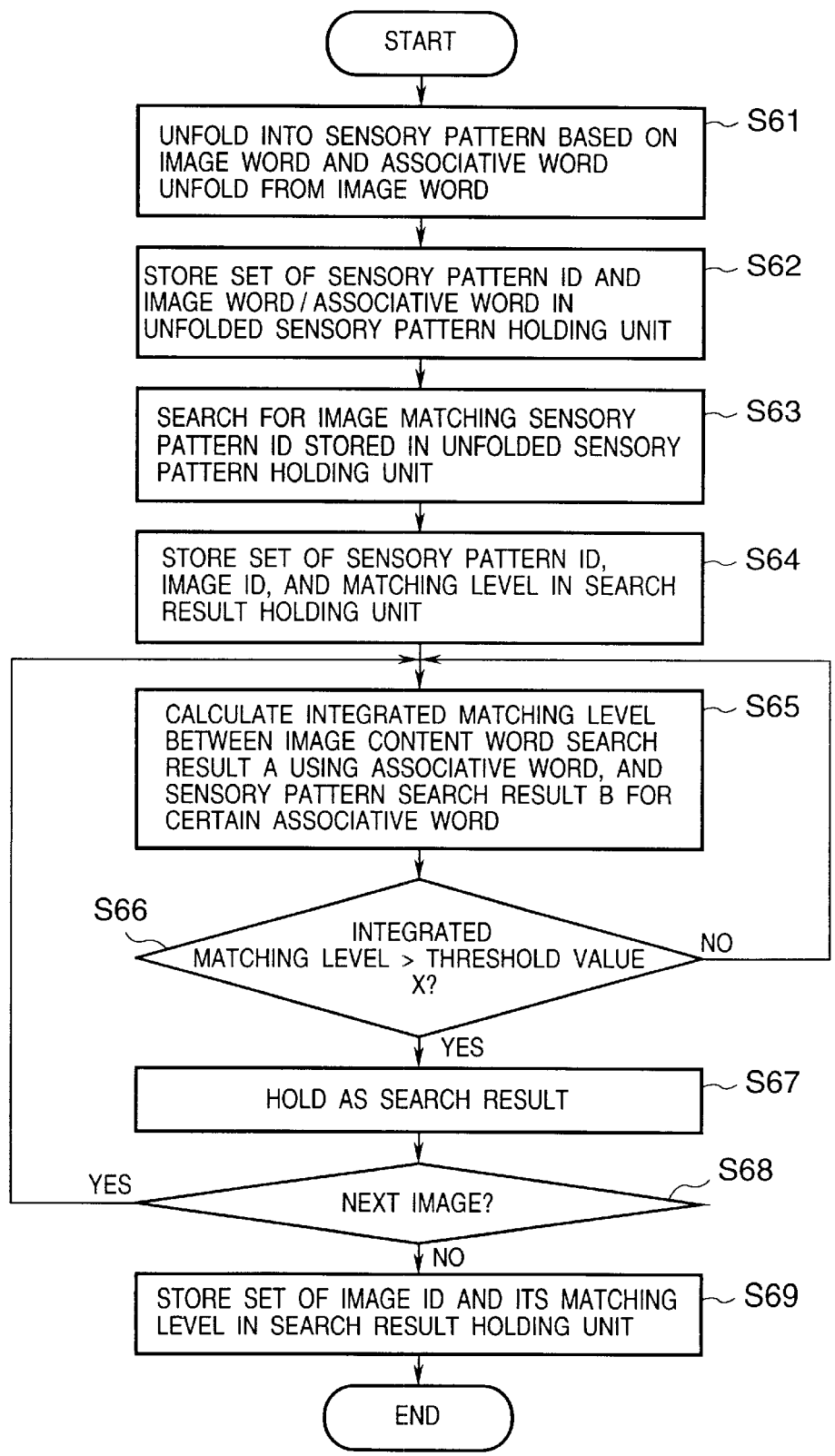
FIG. 21 is a flow chart showing the details of a sensory pattern unfolding process 212, sensory pattern search process 214, and search result integration process 217.

FIG. 21 is a flow chart showing the details of the sensory pattern unfolding process 212, sensory pattern search process 214, and search result integration process 217.

As described above, the user inputs a search request for searching images by the search request input process 201. The search request contains one or a plurality of query words, search perspectives, and the like. The query word input in this embodiment is an abstract image word that expresses impressions of images such as "refreshing", "warm", and the like. In this embodiment, assume that an image word "refreshing" is stored.

Steps S61 and S62 are implemented by the sensory pattern unfolding process 212. In step S61, the image word held in the query word holding unit 202 is unfolded into sensory patterns with reference to the image word/sensory pattern correspondence holding unit 215. In this embodiment, the query word holding unit 202 stores the image word "refreshing", the unfolded associative word holding unit 209 holds associative words "forest", "tableland", "blue sky", and the like unfolded from "refreshing", and the image word is unfolded into corresponding sensory pattern IDs with reference to the image word/sensory pattern correspondence holding unit 215. For example, sensory pattern IDs "005" and "006" corresponding to image word "refreshing"—associative word "forest" are acquired, and a sensory pattern ID "007" corresponding to image word "refreshing"—associative word "tableland" is acquired.

The flow then advances to step S62 to store the sets of unfolded sensory pattern IDs and image words/associative words in the unfolded sensory pattern holding unit 213. The data storage in the unfolded sensory pattern holding unit 213 is as has already been described previously with reference to FIG. 11.

The flow advances to step S63. Steps S63 and S64 are implemented by the sensory pattern search process 214. In step S63, all image IDs of images having matching levels larger than zero with respect to the sensory pattern IDs stored in the unfolded sensory pattern holding unit 213 are acquired. This process is done for all the sensory patterns held in the unfolded sensory pattern holding unit 213. Note that the sensory pattern search process 214 acquires image IDs having matching levels larger than zero with respect to the sensory pattern IDs respectively unfolded from the query word and antithetic concept.

In step S64, sets of acquired sensory pattern IDs, image IDs, and their matching levels acquired in step S63 are stored in the search result holding unit 216.

The flow then advances to step S65. Steps S65 to S69 are implemented by the search result integration process 217. That is, two sets of search results, i.e., the image content word search results using associative words and sensory pattern search results, which are held in the search result holding unit 216, are integrated into one set of search results on the basis of the search weights stored in the determined weight holding unit 207 with reference to those search results. When the sensory pattern search results include a sensory pattern based on the antithetic concept to the query word, the corresponding image is excluded from the integrated results. Or the sensory pattern matching level of an image including an sensory pattern of the antithetic concept may be lowered upon integration.

In this integration process, a method of obtaining common elements of two sets of search results in units of associative words (ANDing search results), a method of calculating integrated matching levels based on the weights on the searches, and selecting appropriate search results in descending order of integrated matching levels, and the like are available. In this embodiment, the method of calculating the integrated matching levels will be exemplified below.

Let A be the associative matching level of an image that matches, e.g., an associative word "forest" stored in the search result holding unit 216, B be the sensory matching level of an image that matches the sensory pattern ID "005" corresponding to the associative word "forest", and w1 and w2 (w1+w2=1) be the search weights stored in the determined weight holding unit 207. Then, the integrated matching level is given by:

$$\text{Integrated matching level} = w1 \times A + w2 \times B$$

or $$\text{Integrated matching level} = (w1 \times A^2 + w2 \times B^2)^{1/2}$$

The integrated matching levels of all sensory patterns of all associative words are calculated. When one image ID has matching levels larger than zero with respect to a plurality of sensory pattern IDs, a plurality of integrated matching levels are obtained for one image. However, in this case, an image with the highest integrated matching level is adopted as a search result (step S65).

This process is done for all images corresponding to either set of search results larger than zero, and images whose integrated matching levels are larger than a predetermined threshold value X are selected as integrated search results (steps S66, S67, and S68).

In step S69, the sets of image IDs and their integrated matching levels are stored in the search result holding unit 216, thus ending the search process.

An image registration process for registering test images will be explained below with reference to FIG. 22.

Figure 22:
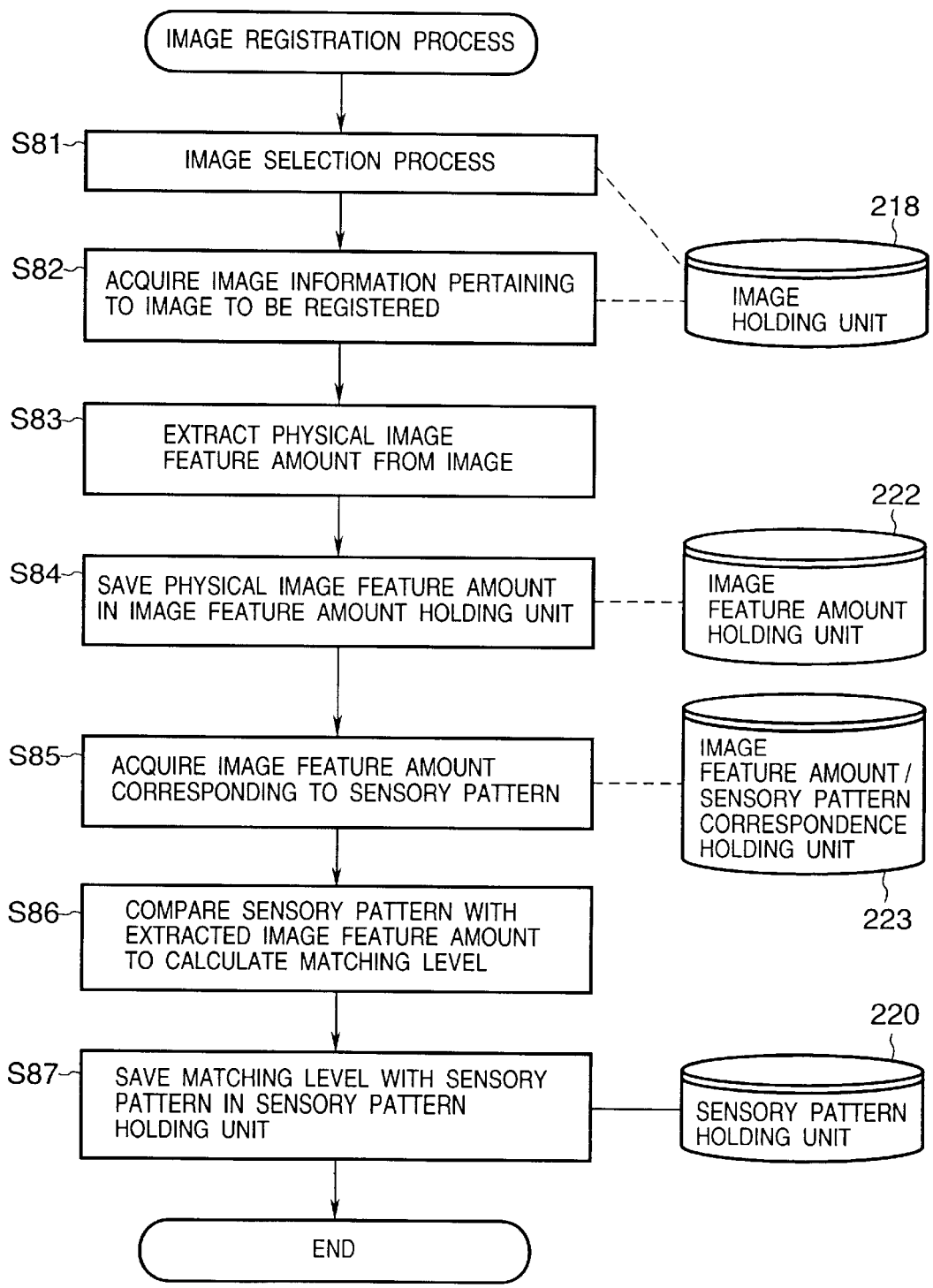
FIG. 22 is a flow chart showing an example of a pre-process of a search, which is done upon registering an image.

FIG. 22 is a flow chart showing an example of a search pre-process executed upon registering images. This process is controlled in accordance with a processing program stored in the DISK 14.

In step S81, the user designates an image to be registered. The image to be registered is designated from those stored in an external storage device, an image input device, an image database server connected to this image processing apparatus, or the like (none of them are shown). In this embodiment, assume that images serving as test images are stored in advance, and the image to be registered is selected from them.

The flow then advances to step S82. In step S82, an image ID corresponding to the designated image file name, and various kinds of image information required for registration are acquired, and are supplied to the image feature extraction process 221. The image ID is stored in correspondence with the image file name to manage an image, and is acquired by searching data in the image holding unit 218 using the image file name. Various kinds of information of the image include pixel values indicating the width and height of an image, the number of bits per pixel, the image size (in units of bytes), the address of the area where a bitmap image is actually stored, and the like, for example, when the file format of this image is the bitmap format. Since these pieces of image information are stored in the header field of the image file, they can be acquired by referring to the header field. Even when the file format of the image is not the bitmap format but JFIF or FlashPix, required information can be similarly obtained from the header field of a file. Or the image holding unit 218 may store such image information, and the image information may be acquired by referring to the image holding unit 218 upon registration.

The flow advances to step S83. Step S83 is implemented by the image feature amount extraction process 221, and extracts physical image feature amounts by analyzing the image information corresponding to the designated image ID. FIG. 15 above shows an example of the image feature amounts in this embodiment, and representative colors are extracted in units of image regions/blocks. The representative color may be obtained by using a scheme of analyzing an actual bitmap image using various kinds of input image information in units of pixels, and calculating the average value of color components (values in a color space such as RGB, HVC, or the like) used in each region or block, or a color component with the highest frequency of occurrence as a representative color.

The flow advances to step S84. In step S84, image feature amounts $c1$ to $cn$ extracted in step S83 are stored in the image feature amount holding unit 222 in correspondence with the image ID of this image. The data storage format in this case is as has already been described previously with reference to FIG. 16.

The flow advances to step S85, and all sensory pattern IDs stored in the image feature amount/sensory pattern correspondence holding unit 223, and image feature amounts corresponding to those sensory patterns are acquired with reference to the image feature amount/sensory pattern correspondence holding unit 223. In this embodiment, the chromatic feature amounts correspond to the individual sensory patterns, as has already been described previously with reference to FIG. 17.

The flow advances to step S86, and the matching level between each sensory pattern acquired in step S85 and the image feature amounts corresponding to this image is calculated. This process is done by the sensory pattern determination process 224. That is, the chromatic image feature amounts corresponding to each of the sensory patterns acquired in step S85 are compared with the image feature amounts extracted in step S83 to calculate their matching level. The matching levels for all sensory patterns stored in the image feature amount/sensory pattern correspondence holding unit 223 are calculated. The matching level is calculated using a scheme such as vector computations, statistic processes, or the like using cosine measure.

The flow advances to step S87. In step S87, the matching levels between all the sensory patterns and the image calculated in step S86 are stored in the sensory pattern holding unit 220 in correspondence with the image ID of this image. The image storage example in the sensory pattern holding unit 220 is as has already been described previously with reference to FIG. 13.

The aforementioned process is done for all images to be registered.

As described above, according to this embodiment, a search using feature amount data of multimedia information itself and a search using a content word appended to multimedia information are made on the basis of associative words, which are associated with a query word, and final search results can be obtained from the results of the two search processes. For this reason, desired image information can be accurately extracted.

As described above, according to this embodiment, since a search request (query word, search perspective, and the like) which is to be considered upon searching for desired multimedia information can be designated, an appropriate search can be made in accordance with the designated search request, and desired image information can be accurately extracted.

According to this embodiment, upon obtaining search results by integrating search results obtained by a search using keywords appended to images, and those obtained by a search using feature amount data of images themselves, since the weight ratios on the two search processes can be changed in correspondence with a query word, the image information wanted can be accurately extracted. For example, when a keyword "happy" is input as a search request, it is hard to associate it with image feature amounts since its meaning is essentially lexical. Hence, if a search that attaches importance on the image feature amount is made, images which do not match the search request are highly likely to be presented. On the other hand, for example, when a keyword "showy" is input as a search request, the keyword "showy" is more likely to evoke meanings measurable as image feature amounts. For this reason, if a search is made while attaching importance on content words appended to images, images which do not match the search request indicated by the input keyword are highly likely to be presented. Or actually "showy" images may be excluded from the search results. By contrast, according to this embodiment, when a query word "happy" is set via the user interface shown in FIG. 4, heavier weights are set on associative words; when a query word "showy" is set, heavier weights are set on sensory patterns, thus making an accurate search with respect to either query word. of course, when the associated weight 83 and sensory pattern weight 84 in the concept discrimination dictionary 205 are appropriately set, an appropriate search can be made by only instructing to "use default weight values" on the user interface shown in FIG. 4.

In the above embodiment, image information is used as stored information serving as test images. As for multimedia information (e.g., audio information) other than image information, the present invention can be applied by executing information feature amount extraction, and pairing the extracted information feature amount with sensory patterns.

In the above description, the image holding unit 218, image content word holding unit 219, and sensory pattern holding unit 220 which undergo a search are allocated on the DISK 14 that builds a single device, but these building components may be distributed on different devices, and processes may be done on the network via the NIC 19.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An information search apparatus for searching information based on an input query word, comprising:
   first search means for determining a query keyword on the basis of the query word, and searching information on the basis of the query keyword;
   second search means for determining a feature amount corresponding to the query word, and searching information on the basis of the feature amount;
   setting means for setting a search weight to be assigned to search results of said first and second search means; and
   integration means for integrating search results obtained by said first and second search means in accordance with the search weight set by said setting means.

2. The apparatus according to claim 1, wherein the search weight includes a first weight corresponding to the search result of said first search means, and a second weight corresponding to the search result of said second search means, and
   said integration means applies the first weight to a search matching level of each information as the search result of said first search means and the second weight to a search matching level of each information as the search result of said second search means to obtain an integrated search matching level, and obtains integrated search results on the basis of the integrated search matching level.

3. The apparatus according to claim 2, wherein said integration means selects a predetermined number of pieces of information in descending order of integrated search matching level, and determines the selected information as the integrated search results.

4. The apparatus according to claim 1, wherein said setting means allows a user to set desired weight ratios with respect to the search results of said first and second search means.

5. The apparatus according to claim 1, further comprising:
   a weight dictionary which registers weights corresponding to said first and second search means in relation to the query word, and
   wherein said setting means sets the weights with reference to said weight dictionary.

6. The apparatus according to claim 5, wherein said first search means derives an associative word associated with the query word, and uses the query word and the derived associative word as query keywords,
   said weight dictionary registers weights in units of associative perspectives that connect query words and associative words in units of query words, and
   said setting means sets the weights with reference to said weight dictionary on the basis of the query word and an associative perspective designated by a user.

7. The apparatus according to claim 1, wherein the information searched is image data,
   said apparatus further comprises:
   an image content word holding unit for storing the image data and content words which verbalize concepts expressed in the image data in correspondence with each other; and
   an associative word dictionary for storing associative words associated with the content words, and
   said first search means acquires an associative word corresponding to the query word from said associative word dictionary, and searches said image content word holding unit on the basis of the acquired associative word.

8. The apparatus according to claim 7, further comprising:
   a concept discrimination dictionary for storing index words and antithetic concepts corresponding to the index words in correspondence with each other; and
   input means for inputting the query word and a search perspective, and
   wherein said first search means acquires an index word and antithetic concept corresponding to the query word from said concept discrimination dictionary on the basis of the query word and search perspective input by said input means, and acquires an associative word corresponding to the query word from said associative word dictionary on the basis of the acquired index word and antithetic concept.

9. The apparatus according to claim 1, further comprising:
   a holding unit for storing associative words and sensory patterns in correspondence with each other, and
   wherein said second search means acquires a sensory pattern corresponding to an associative word, which corresponds to the query word, from said holding unit, and extracts a feature amount of the acquired sensory pattern as the feature amount corresponding to the query word.

10. The apparatus according to claim 1, wherein multimedia information is image information, and the feature amount is a physical image feature amount obtained by analyzing the image information.

11. The apparatus according to claim 10, wherein the feature amount includes at least one of color scheme information, composition information, and shape information contained of an image.

12. An information search method for searching information based on an input query word, comprising:
   a first search step, of determining a query keyword on the basis of the query word, and searching information on the basis of the query keyword;
   a second search step, of determining a feature amount corresponding to the query word, and searching information on the basis of the feature amount;
   a setting step, of setting a search weight to be assigned to search results in the first and a second search steps; and an integration step, of integrating search results obtained in the first and a second search steps in accordance with the search weight set in the setting step.

13. The method according to claim 12, wherein the search weight includes a first weight corresponding to the search result in the first search step, and a second weight corresponding to the search result in the second search step, and the integration step includes the step of applying the first weight to a search matching level of each information as the search result in the first search step and the second weight to a search matching level of each information as the search result in the second search step to obtain an integrated search matching level, and obtaining integrated search results on the basis of the integrated search matching level.

14. The method according to claim 13, wherein the integration step includes the step of selecting a predetermined number of pieces of information in descending order of integrated search matching level, and determining the selected information as the integrated search results.

15. The method according to claim 12, wherein the setting step includes the step of allowing a user to set desired weight ratios with respect to the search results in the first and second search steps.

16. The method according to claim 12, wherein the setting step includes a step of setting the weights with reference to a weight dictionary which registers weights corresponding to the first and second search steps in relation to the query word.

17. The method according to claim 16, wherein the first search step includes a step of deriving an associative word associated with the query word, and using the query word and the derived associative word as query keywords, the weight dictionary registers weights in units of associative perspectives that connect query words and associative words in units of query words, and the setting step includes a step of setting the weights with reference to the weight dictionary on the basis of the query word and an associative perspective designated by a user.

18. The method according to claim 12, wherein the information searched is image data, and said method is performed using:

an image content word holding unit for storing the image data and content words which verbalize concepts expressed in the image data in correspondence with each other; and an associative word dictionary for storing associative words associated with the content words, and wherein the first search step includes a step of acquiring an associative word corresponding to the query word from the associative word dictionary, and searching the image content word holding unit on the basis of the acquired associative word.

19. The method according to claim 18, wherein said method is performed using a concept discrimination dictionary for storing index words and antithetic concepts corresponding to the index words in correspondence with each other; and wherein said method further comprises an input step, of inputting the query word and a search perspective, and wherein the first search step includes a step of acquiring an index word and antithetic concept corresponding to the query word from the concept discrimination dictionary on the basis of the query word and search perspective input in the input step, and acquiring an associative word corresponding to the query word from the associative word dictionary on the basis of the acquired index word and antithetic concept.

20. The method according to claim 12, wherein said method is performed using a holding unit for storing associative words and sensory patterns in correspondence with each other, and wherein the second search step includes a step of acquiring a sensory pattern corresponding to an associative word, which corresponds to the query word, from the holding unit, and extracting a feature amount of the acquired sensory pattern as the feature amount corresponding to the query word.

21. The method according to claim 12, wherein multimedia information is image information, and the feature amount is a physical image feature amount obtained by analyzing the image information.

22. The method according to claim 21, wherein the feature amount includes at least one of color scheme information, composition information, and shape information contained of an image.

23. A storage medium for storing a control program which makes a computer search information based on an input query word, said control program comprising:

a code of the first search step of determining a query keyword on the basis of the query word, and searching information on the basis of the query keyword;

a code of the second search step of determining a feature amount corresponding to the query word, and searching information on the basis of the feature amount;

a code of the setting step of setting a search weight to be assigned to search results in the first and second search steps; and a code of the integration step of integrating search results obtained in the first and second search steps in accordance with the search weight set in the setting step.

* * * * *

UNITED STATES PATENT AND TRADEMARK OFFICE
CERTIFICATE OF CORRECTION

PATENT NO.     : 6,526,400 B1
DATED          : February 25, 2003
INVENTOR(S)    : Takata et al.

It is certified that error appears in the above-identified patent and that said Letters Patent is hereby corrected as shown below:

<u>Column 5,</u>
Line 18, "an" should read -- and --.

<u>Column 6,</u>
Line 33, ".holding" should read -- holding --.

<u>Column 8,</u>
Line 20, "no," should read -- no --.

<u>Column 18,</u>
Line 36, "of" should read -- Of --.

Signed and Sealed this

Ninth Day of December, 2003

JAMES E. ROGAN
*Director of the United States Patent and Trademark Office*